United States Patent
Shah et al.

(10) Patent No.: US 8,375,194 B2
(45) Date of Patent: Feb. 12, 2013

(54) SYSTEM AND METHOD FOR FREEING MEMORY

(75) Inventors: Viral S. Shah, Cupertino, CA (US);
Sudhir R. Shetiya, Mumbai (IN);
Anoop Sharma, San Jose, CA (US);
Lars B. Plum, Milpitas, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 301 days.

(21) Appl. No.: 12/788,706

(22) Filed: May 27, 2010

(65) Prior Publication Data

US 2011/0296135 A1      Dec. 1, 2011

(51) Int. Cl.
*G06F 9/26* (2006.01)
*G06F 9/34* (2006.01)

(52) U.S. Cl. ..................................... 711/206
(58) Field of Classification Search ................ None
See application file for complete search history.

(56) References Cited

U.S. PATENT DOCUMENTS

| | | | |
|---|---|---|---|
| 4,636,940 A | 1/1987 | Goodwin, Jr. | |
| 4,758,946 A | 7/1988 | Shar et al. | |
| 5,093,913 A * | 3/1992 | Bishop et al. | 711/152 |
| 5,119,290 A | 6/1992 | Loo et al. | |
| 5,247,638 A | 9/1993 | O'Brien et al. | |
| 5,392,415 A * | 2/1995 | Badovinatz et al. | 718/100 |
| 5,809,495 A * | 9/1998 | Loaiza | 1/1 |
| 5,983,329 A * | 11/1999 | Thaler et al. | 711/163 |
| 7,003,586 B1 * | 2/2006 | Bailey et al. | 709/250 |
| 7,487,329 B2 * | 2/2009 | Hepkin et al. | 711/203 |
| 7,739,422 B2 | 6/2010 | Hua et al. | |
| 8,321,638 B2 * | 11/2012 | van Riel et al. | 711/154 |
| 2002/0199075 A1 * | 12/2002 | Jacobs | 711/163 |
| 2010/0211756 A1 * | 8/2010 | Kaminski et al. | 711/172 |

OTHER PUBLICATIONS

VMware Understanding Memory Resource Management in VMware® ESX™ Server—(Revision 20090820)—p. 5.*

* cited by examiner

*Primary Examiner* — Christian P Chace
*Assistant Examiner* — Rocio Del Mar Perez-Velez (57) ABSTRACT

There is provided a computer-executed method of freeing memory. One exemplary method comprises receiving a message from a user process. The message may specify a virtual address for a memory segment. The virtual address may be mapped to the memory segment. The memory segment may comprise a physical page. The method may further comprise identifying the physical page based on the virtual address. Additionally, the method may comprise freeing the physical page without unmapping the memory segment.

12 Claims, 6 Drawing Sheets

SYSTEM AND METHOD FOR FREEING MEMORY

BACKGROUND

Databases often allocate large, multiple, contiguous memory segments from the kernel, and use dynamic storage allocators to manage them as heaps. The dynamic storage allocators are known as heap managers. When a query deallocates memory that was obtained from a heap, the heap manager adds the deallocated memory to a list of free blocks.

Typically, the heap manager does not communicate with the operating system regarding the freed blocks. As such, the blocks are not freed as far as the operating system is concerned. This results in artificial memory pressure because otherwise available memory is not being made available to the operating system.

Further, because the operating system memory manager is not aware of the free blocks, disk input/output operations (I/Os) may be wasted. The operating system memory manager may swap out dirty pages to disk periodically. If the dirty pages swapped out to disk are located within freed blocks of memory, there is no need to swap the pages out to disk. This results in unnecessary disk I/Os. Additionally, if the database reallocates the heap memory that was freed, the pages may be swapped in from the disk. This may result in unnecessary I/O as the database no longer needs the data present in the memory pages before they were freed.

BRIEF DESCRIPTION OF THE DRAWINGS

Certain exemplary embodiments are described in the following detailed description and in reference to the drawings, in which.

DETAILED DESCRIPTION

Figure 1A:
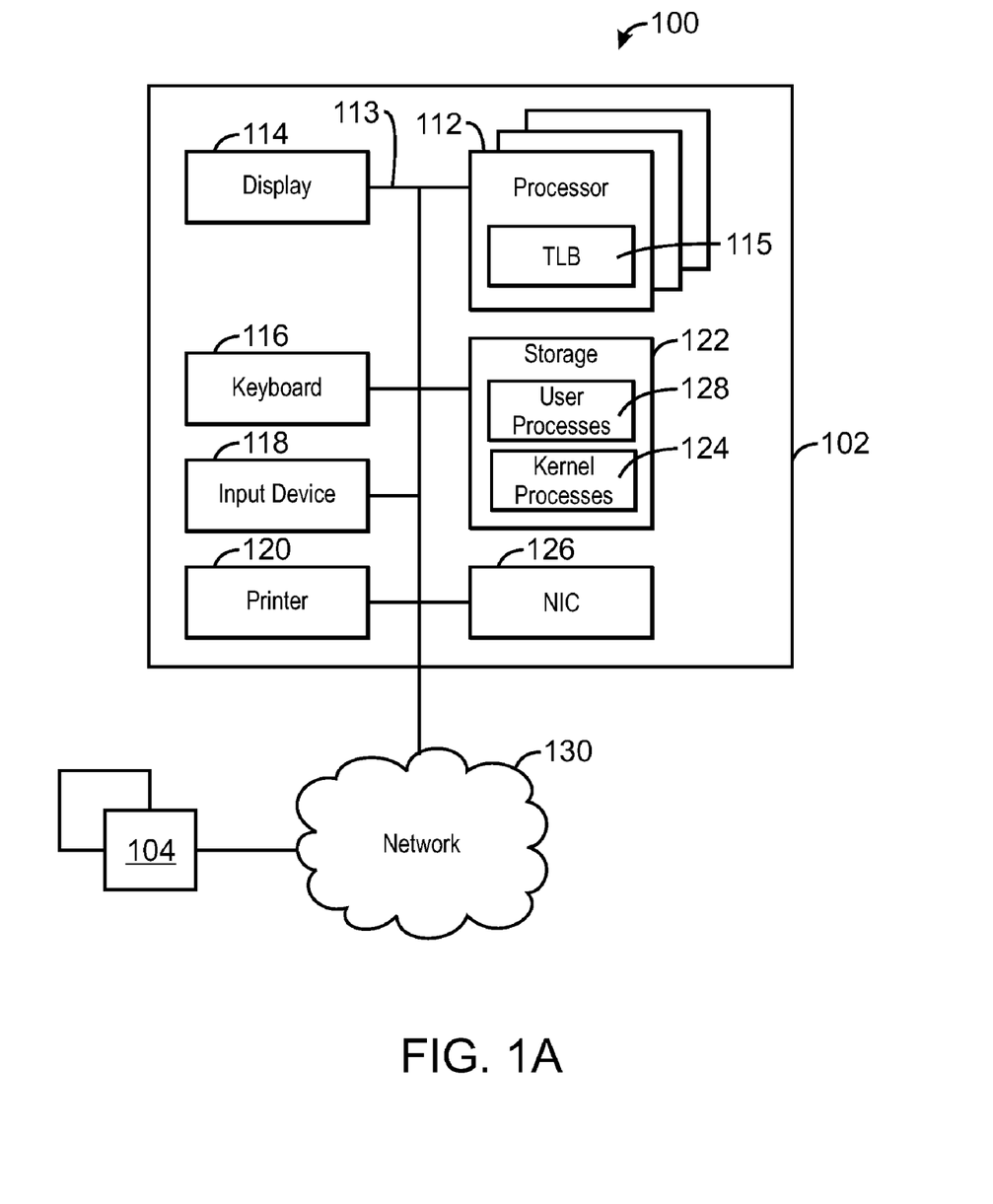
FIG. 1A is a block diagram of a system adapted to free memory according to an exemplary embodiment of the present invention.

FIG. 1A is a block diagram of a system adapted to free memory according to an exemplary embodiment of the present invention. The system is generally referred to by the reference number 100. Those of ordinary skill in the art will appreciate that the functional blocks and devices shown in FIG. 1A may comprise hardware elements including circuitry, software elements including computer code stored on a tangible, machine-readable medium or a combination of both hardware and software elements. Additionally, the functional blocks and devices of the system 100 are but one example of functional blocks and devices that may be implemented in an exemplary embodiment of the present invention. Those of ordinary skill in the art would readily be able to define specific functional blocks based on design considerations for a particular electronic device.

The system 100 may include a server 102, and one or more client computers 104, in communication over a network 130. As illustrated in FIG. 1A, the server 102 may include one or more processors 112 which may be connected through a bus 113 to a display 114, a keyboard 116, one or more input devices 118, and an output device, such as a printer 120. The input devices 118 may include devices such as a mouse or touch screen.

The processors 112 may include a translation lookaside buffer (TLB). The TLB may be a CPU cache used for efficient translation of virtual addresses to physical addresses.

The server 102 may also be connected through the bus 113 to a network interface card (NIC) 126. The NIC 126 may connect the server 102 to the network 130. The network 130 may be a local area network (LAN), a wide area network (WAN), or another network configuration. The network 130 may include routers, switches, modems, or any other kind of interface device used for interconnection.

Through the network 130, several client computers 104 may connect to the server 102. The client computers 104 may be similarly structured as the server 102.

The server 102 may have other units operatively coupled to the processor 112 through the bus 113. These units may include tangible, machine-readable storage media, such as a storage 122. The storage 122 may include media for the long-term storage of operating software and data, such as hard drives. The storage 122 may also include other types of tangible, machine-readable media, such as read-only memory (ROM), random access memory (RAM), and cache memory. The storage 122 may include the software used in exemplary embodiments of the present techniques.

Software that executes on the server 102 may operate in a user mode or a kernel mode. In kernel mode, the executing code has complete and unrestricted access to the underlying hardware. The executing code may execute any CPU instruction and reference any memory address. The kernel mode is generally reserved for the lowest-level, most trusted functions of an operating system. For example, the kernel processes 124 may be software that operates in kernel mode.

In user mode, the executing code has no ability to directly access hardware or reference memory. Rather, code executing in user mode may make requests to the kernel processes 124 to access hardware or memory. For example, the user processes 128 may be software that operates in user mode. In an exemplary embodiment of the invention, the user processes 128 may include a database management system (DBMS). In another exemplary embodiment of the invention, the kernel processes 124 may free pages of memory in the storage 122 in response to requests from the user processes 128.

Figure 1B:
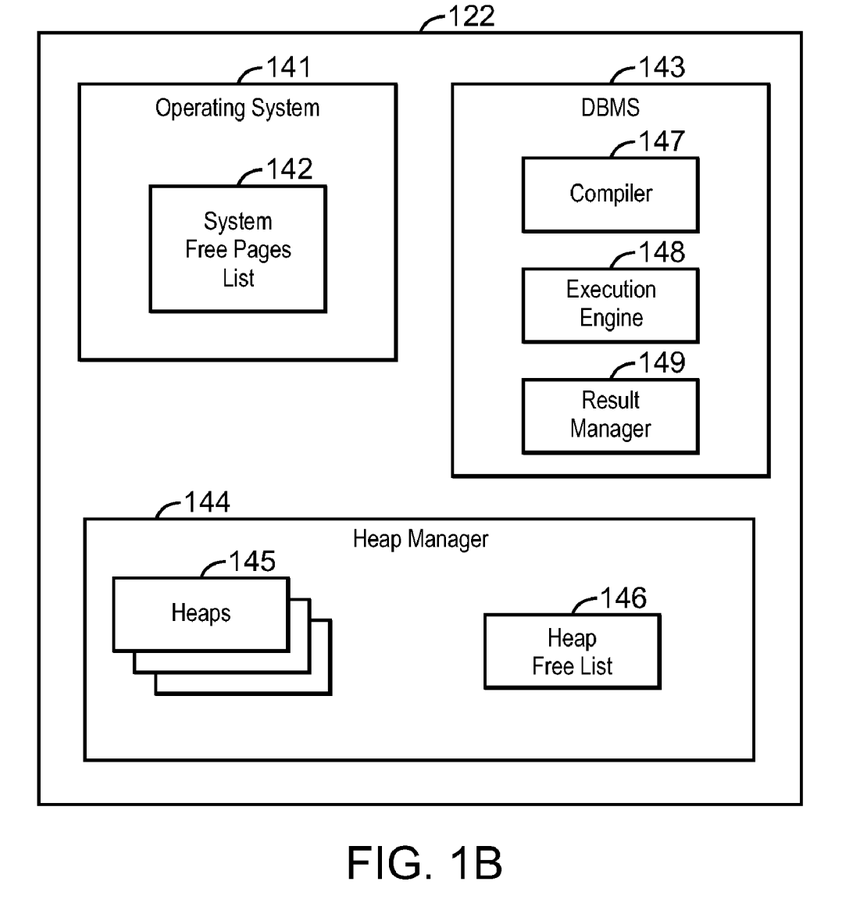
FIG. 1B is a block diagram of a storage for a system adapted to free memory according to an exemplary embodiment of the present invention.

FIG. 1B is a block diagram of the storage 122 for the system 100 adapted to free memory according to an exemplary embodiment of the present invention. As illustrated, the storage 122 may include a DBMS 143, an operating system (O/S) 141, and a heap manager 144.

The operating system 141 may manage the sharing of the resources of the server 102. In particular, the operating system 141 may handle the resource allocation and access protection of the storage 122. In an exemplary embodiment of the invention, the operating system 141 may free physical pages of memory in the storage 122 in response to requests from the DBMS 143.

The operating system 141 may include a system free pages list 142. The system free pages list 142 may specify physical pages of memory that are available for allocation to the user processes 128 and the kernel processes 124. When the O/S allocates a physical page from the system free pages list 142, the reference to the physical page may be removed from the system free pages list 142. Similarly, when the O/S frees a physical page of memory, a reference to the physical page may be added to the system free pages list 142.

The DBMS 143 may be a set of computer programs that controls the creation, maintenance, and use of databases by an organization and its end users. The DBMS 143 may include a compiler 147, an execution engine 148, and a result manager 149.

The compiler 147 may be software that generates query plans (not shown) based on queries submitted by users to the DBMS 143. The query plans may specify how the work of the query is to be accomplished. The query plans may be implemented at runtime by the execution engine 148.

The result manager 149 may present to the user any output that the executed query plan generates. Each of the compiler 147, execution engine 148, and result manager 149 may make requests to the heap manager 144 regarding memory used to facilitate their particular tasks.

The heap manager 144 may be software that manages memory requests from the DBMS 143. As stated previously, the heap manager 144 may allocate memory to the DBMS 143 in heaps 145. The heaps 145 are described in greater detail with reference to FIG. 2.

The heap manager 144 may also maintain a heap free list 146. The heap free list 146 may specify segments of memory that are available for allocation to the DBMS 143. In response to requests from the DBMS 143 to deallocate a memory segment, the heap manager 144 may add the deallocated memory segment to the free heap list 146.

With regard to allocation requests, if there is not enough memory available in the heaps 145 to fulfill a request, the heap manager 144 may make a request to the operating system 141 for an additional chunk of memory to add to the heaps 145. Typically, the chunks may be provided in sizes ranging from 2 to 8 megabytes.

Figure 2:
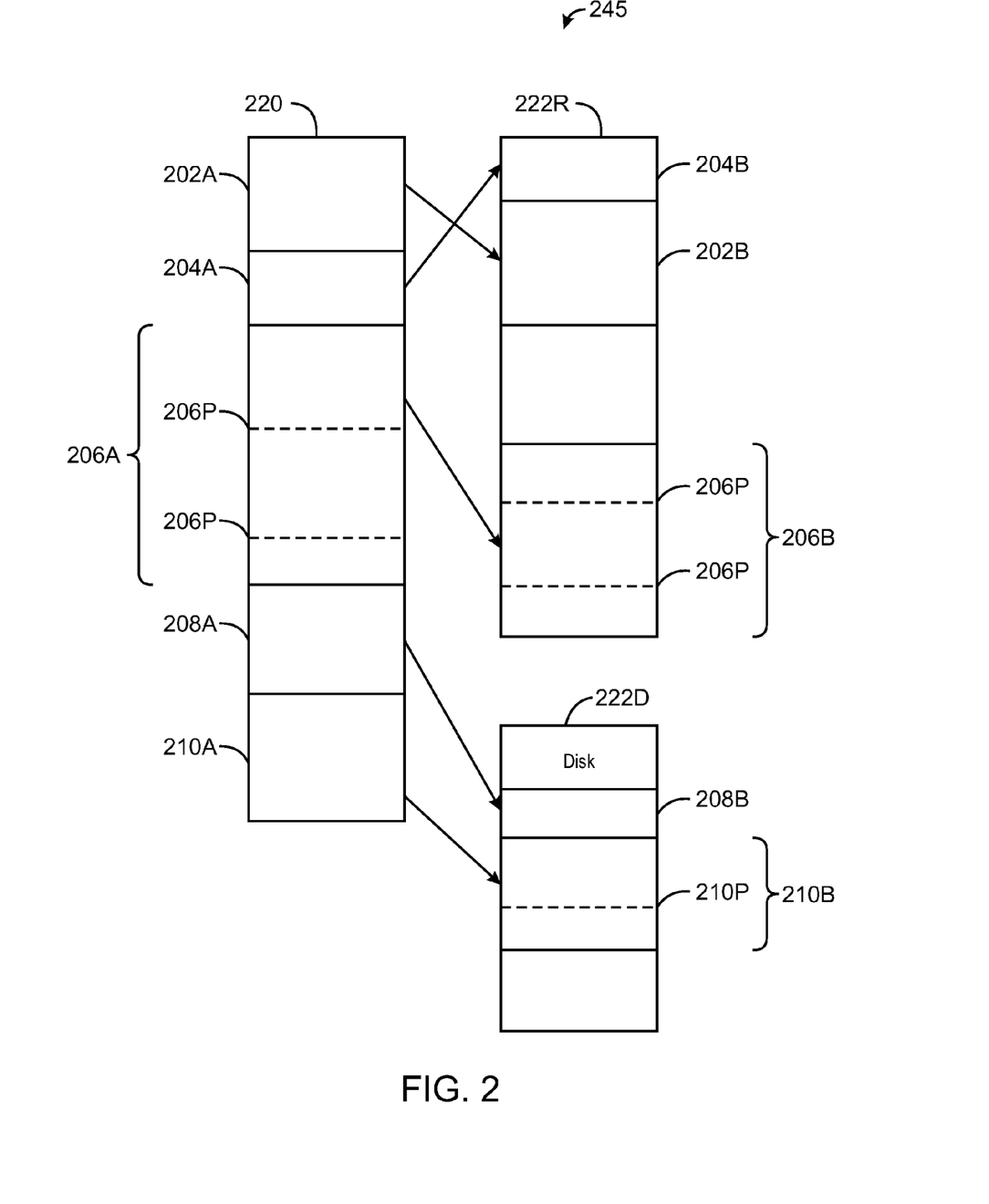
FIG. 2 is a diagram showing an exemplary heap in a system for freeing memory according to an exemplary embodiment of the present invention.

FIG. 2 is a diagram showing an exemplary heap 245 in a system for freeing memory according to an exemplary embodiment of the present invention. As shown, the heap 245 may be a mapping of virtual memory 220 to physical memory, such as RAM 222R, and disk 222D.

The virtual memory 220 may include numerous contiguous virtual memory segments 202A, 204A, 206A, 208A, and 210A. Each of the virtual memory segments 202A, 204A, 206A, 208A, and 210A may have a virtual address that is mapped to a corresponding physical memory segment 202B, 204B, 206B, 208B, and 210B.

As shown, in contrast to the virtual memory segments 202A, 204A, 206A, 208A, and 210A, the physical memory segments 202B, 204B, 206B, 208B, and 210B may have addresses that are non-contiguous. In fact, the physical memory segments 202B, 204B, 206B, 208B, and 210B may be disposed on different types of memory, such as a RAM 222R and disk 222D.

The virtual memory addresses may be a set of contiguous addresses that the DBMS 143 uses when referencing memory locations. The physical addresses may be the set of corresponding physical addresses that the operating system 141 uses to retrieve and store data in response to requests from the DBMS 143.

As shown, the virtual memory segments 206A and 210A include page boundaries 206P and 210P. The page boundaries 206P and 210P may represent the beginning of a physical page of memory in the RAM 222R.

The physical memory segment 206B corresponding to the virtual memory segment 206A may include one entire physical page of memory (as represented by two page boundaries 206P). In an exemplary embodiment of the invention, when the virtual memory segment 206A is deallocated in the heap 245, the physical page represented by boundaries 206P may be freed by the operating system 141.

Typically, the operating system 141 may unmap the memory segment 206A when freeing the physical page of memory. Unmapping a memory segment includes removing the association between virtual addresses and heaps. Moreover, unmapping the memory segment eliminates the availability of virtual address segments and associated physical memory.

However, in an exemplary embodiment of the invention, the operating system 141 may free the physical page of memory at the request of a user process without unmapping the memory segment 206A. Freeing physical pages of memory without unmapping the memory segment 206A is an advantage because a user process 128 may then re-allocate the freed physical memory at the virtual address of the memory segment 206A while maintaining availability of the virtual memory segment. This allows a subsequent re-allocation of the virtual segment to generate a page fault rather than aborting the process. When the page fault is processed, a new physical page of memory is assigned to the memory segment 206A, and operation of the user process continues uninterrupted.

Figure 3:
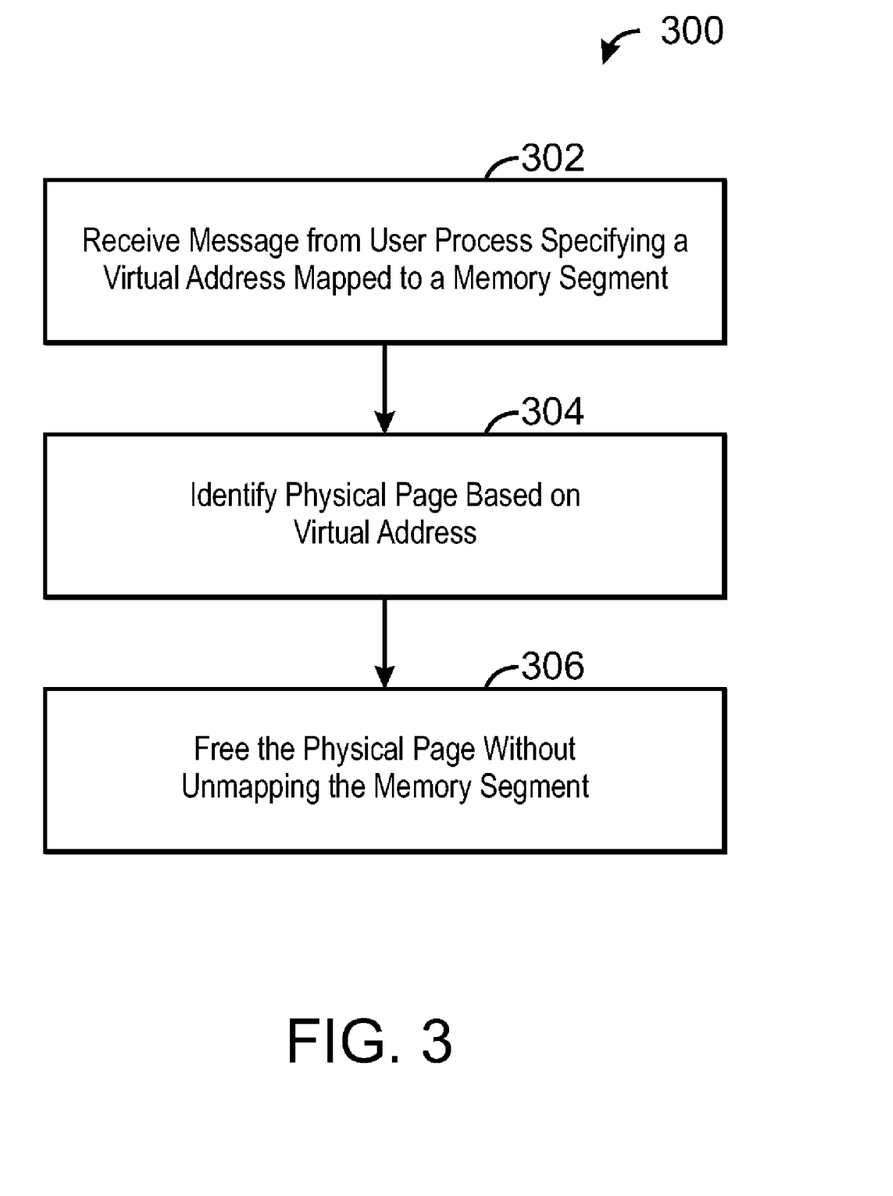
FIG. 3 is a process flow diagram showing a computer-executed method for freeing memory according to an exemplary embodiment of the present invention.

FIG. 3 is a process flow diagram showing a computer-executed method for freeing memory according to an exemplary embodiment of the present invention. The method is generally referred to by the reference number 300, and may be performed by the operating system 141. It should be understood that the process flow diagram is not intended to indicate a particular order of execution.

The method may begin at block 302. At block 302, the operating system 141 may receive a message specifying a virtual address from a user process 128. The message may be a request to free a physical page of memory in the RAM 222R. In an exemplary embodiment of the invention, the message may also specify a memory size. The memory size may represent the amount of virtual memory that is to be freed. The memory size may range from 1 to several pages.

At block 304, the operating system 141 may identify the physical page based on the virtual address. The virtual address specified in the message may correspond to a physical page boundary in the RAM 222R. In an exemplary embodiment of the invention, the operating system 141 may identify the physical page by performing a lookup of the virtual address in the mapping tables maintained by a memory manager of the operating system 141. The mapping tables may consist of page table entries that map a virtual address of user processes 128 as well as kernel processes 124 to physical addresses.

At block 306, the operating system 141 may free the physical page. The operating system 141 may free the physical page by adding a reference to the physical page to the system free pages list 142. In an exemplary embodiment of the invention, the operating system 141 may remove the page table entry for the physical page from the TLB.

Additionally, the operating system 141 may update mapping tables used by the operating system 141 to indicate that there is a dummy physical page, initialized to zeros, assigned to the virtual address. By updating the mapping tables, the virtual address of the heap may be reused even though the physical page has been freed. Further, the page that has been freed may become immediately available for allocation by the operating system 141 to the DBMS 143, other user process 128, or kernel process 124 that need a page.

For example, subsequent to the physical page being freed, the DBMS 143 may request an allocation of a memory segment from the heap 145. In such a case, the heap manager 145 may allocate the memory segment from the heap free list 146 and return the virtual address of the allocation to the DBMS 143.

In the event that the newly allocated virtual address is the one whose physical memory pages have been freed, a page fault may be invoked by the operating system 141. The operating system 141 may then assign a new physical page from the system free pages list 142 to the virtual address that page faulted without having to swap-in any data from the swap file. The re-assignment of the new physical page may be transparent to the DBMS 143.

Advantageously, the DBMS 143 may continue to use the newly assigned physical memory page without making any special calls to the operating system 141. Further, by freeing the physical pages on the heap, dirty pages that have been freed do not have to be swapped out to disk. This saves disk I/O.

Figure 4:
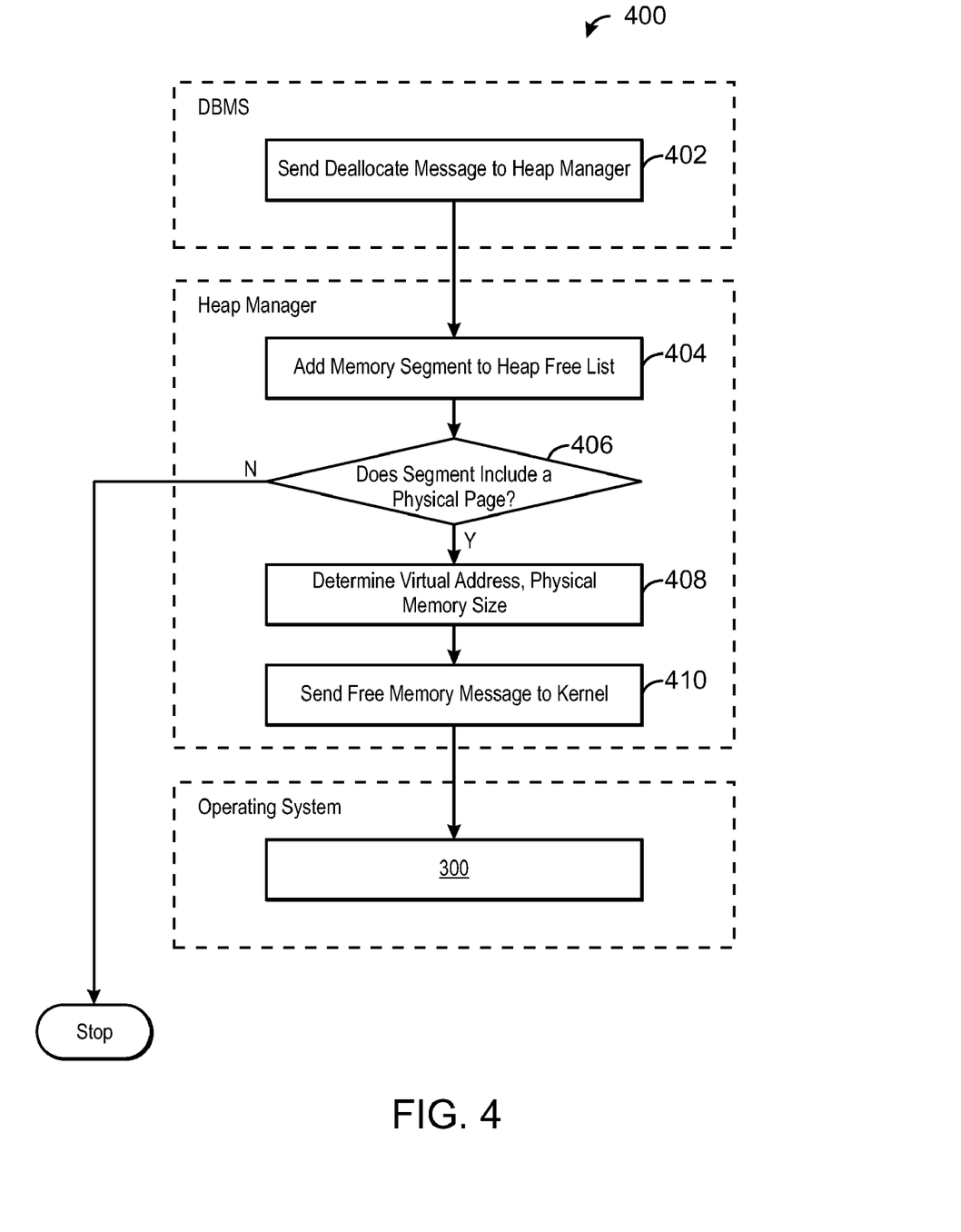
FIG. 4 is a process flow diagram showing a computer-executed method for freeing memory according to an exemplary embodiment of the present invention.

FIG. 4 is a process flow diagram showing a computer-executed method for freeing memory according to an exemplary embodiment of the present invention. The method is generally referred to by the reference number 400, and may be performed by the DBMS 143, the heap manager 144, and the operating system 141. It should be understood that the process flow diagram is not intended to indicate a particular order of execution.

The method begins at block 402. At block 402, the DBMS 143 may send a deallocate message to the heap manager 144. The deallocate message may specify a memory segment in the heap 145 that is to be deallocated. It should be noted that the memory segment may be a portion of a larger segment of virtual memory that belongs to the heap.

At block 404, the heap manager may add the deallocated memory segment to the heap free list 146. At block 406, the heap manager 144 may determine whether the deallocated memory segment includes one or more entire physical pages of memory. If not, the method 400 may be complete.

If the deallocated memory segment does include an entire physical page of memory, at block 408, the heap manager may determine the virtual address of the physical page, and the size (in pages) of memory that have been deallocated. More specifically, the heap manager 144 may determine the virtual address of the page boundary of the physical page. The memory size may be the size in pages that have been deallocated. In an exemplary embodiment of the invention, the size may be determined in bytes.

At block 410, the heap manager 144 may send a free memory message to the operating system 141. The message may specify the virtual address of the page boundary, and the memory size to be freed. The operating system 141 may then perform the method 300 to free the physical memory without unmapping the larger memory segment to which the memory segment belongs.

Figure 5:
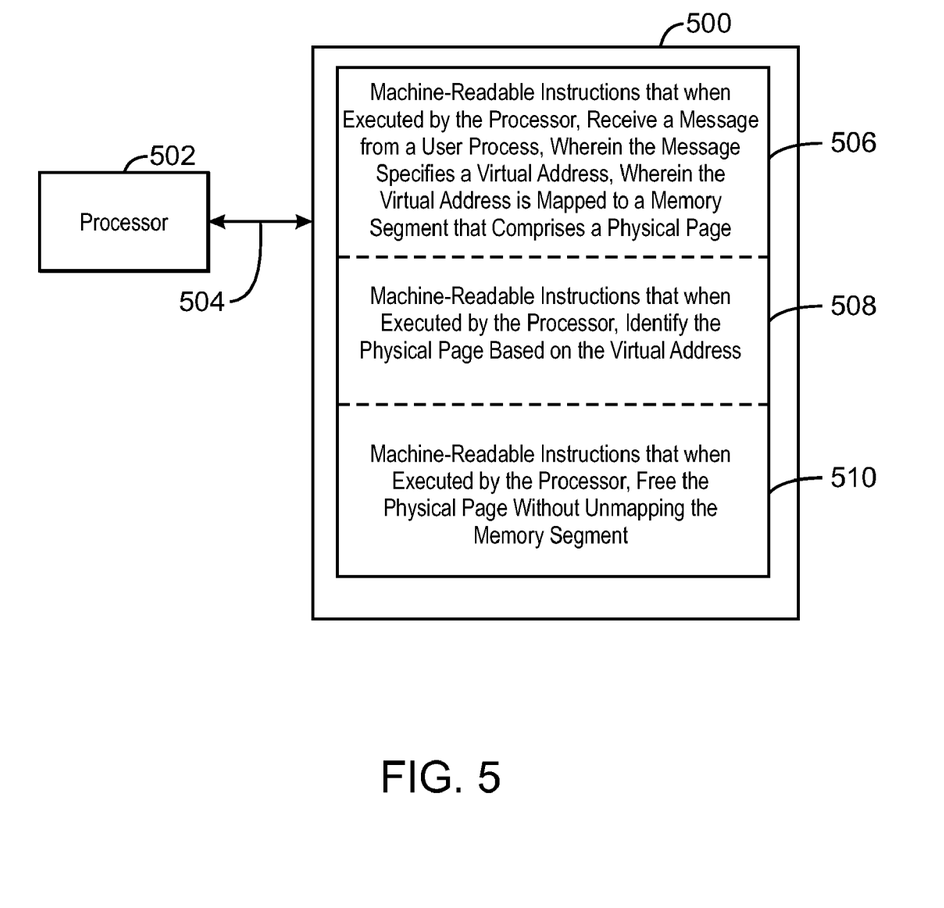
FIG. 5 is a block diagram showing a tangible, machine-readable medium that stores code adapted to freeing memory according to an exemplary embodiment of the present invention.

FIG. 5 is a block diagram showing a tangible, machine-readable medium that stores code adapted to freeing memory according to an exemplary embodiment of the present invention. The tangible, machine-readable medium is generally referred to by the reference number 500.

The tangible, machine-readable medium 500 may correspond to any typical storage device that stores computer-executed instructions, such as programming code or the like. Moreover, tangible, machine-readable medium 500 may be included in the storage 122 shown in FIG. 1A. When read and executed by a processor 502, the instructions stored on the tangible, machine-readable medium 500 are adapted to cause the processor 502 to freeing memory.

A region 506 of the tangible, machine-readable medium 500 stores machine-readable instructions that, when executed by the processor, receive a message that specifies a virtual address for a memory segment that comprises a physical page, from a user process. A region 508 of the tangible, machine-readable medium 500 stores machine-readable instructions that, when executed by the processor, identify the physical page based on the virtual address. A region 510 of the tangible, machine-readable medium 500 stores machine-readable instructions that, when executed by the processor, free the physical page.

What is claimed is:

1. A computer-executed method of freeing memory, comprising:
    receiving, at a heap manager and from a user process, a message that specifies a first memory segment, the first memory segment comprising a physical page to be freed;
    in response to receiving the message, determining a virtual address of a page boundary of the physical page, wherein the virtual address is mapped to the first memory segment; and
    causing an operating system to free the physical page without unmapping the first memory segment based on the virtual address.

2. The method recited in claim 1, wherein the user process comprises software that is executing in a user mode.

3. The method recited in claim 1, wherein the user process comprises a database management system (DBMS) process.

4. The method recited in claim 1, wherein the message specifies an amount of memory comprising the physical page, and wherein causing the operating system to free the physical page comprises causing the operating system to free the specified amount of memory.

5. The method recited in claim 4, wherein the specified amount of memory comprises a plurality of pages.

6. A computer system for freeing memory, the computer system comprising:
    a processor that executes stored instructions; and
    a memory device that stores instructions, the memory device comprising:
    computer-executable code which enables a user process to send a message to a heap manager, wherein the message specifies a memory segment comprising a physical page;
    computer-executable code which, in response to receiving the message to the heap manager, determines a virtual address of a page boundary of the physical page, wherein the virtual address is mapped to the memory segment;
    computer-executable code which enables the user process to send a message to an operating system, wherein the message to the operating system specifies the virtual address; and
    computer-executable code which, in response to receiving the message to the operating system, frees the physical page without unmapping the memory segment.

7. The computer system recited in claim 6, comprising computer-executable code which adds the memory segment to a heap free list.

8. The computer system recited in claim 6, wherein the user process is a database management system (DBMS) process.

9. The computer system recited in claim 6, wherein the message to the operating system specifies an amount of memory comprising the physical page, and wherein the computer-executable code which frees the physical page comprises computer-executable code which frees the specified amount of memory.

10. The computer system recited in claim 6, comprising:
computer-executable code which determines that the physical page is swapped out;
computer-executable code which updates a directory to indicate that the physical page is not to be swapped out; and
computer-executable code which updates a directory to indicate that the physical page is not to be swapped in.

11. The computer system recited in claim 6, comprising:
computer-executed code which sends a request to the heap manager, for a memory allocation, wherein the request specifies the virtual address;
computer-executed code which invokes a page fault handler of an operating system in response to the request;
computer-executed code which associates a second physical page with the virtual address; and
computer-executed code which allocates the second physical page to the user process.

12. A non-transitory, tangible, machine-readable medium that stores code that facilitates freeing memory, comprising:
machine-readable instructions that, when executed by at least one processor, receive a message from a user process that specifies a first memory segment, the first memory segment comprising a physical page to be freed;
machine-readable instructions that, when executed by the at least one processor, determine a virtual address of a page boundary of the physical page, wherein the virtual address is mapped to the first memory segment; and
machine-readable instructions that, when executed by the at least one processor, cause an operating system to free the physical page without unmapping the first memory segment based on the virtual address.

* * * * *